United States Patent [19]

Knutsson et al.

[11] Patent Number: 4,747,152

[45] Date of Patent: May 24, 1988

[54] APPARATUS FOR DETERMINING THE DEGREE OF CONSISTENCY OF A FEATURE IN A REGION OF AN IMAGE THAT IS DIVIDED INTO DISCRETE PICTURE ELEMENTS

[75] Inventors: Hans Knutsson; Martin Hedlund; Gösta Granlund, all of Linköping, Sweden

[73] Assignee: Context Vision AB, Linköping, Sweden

[21] Appl. No.: 865,343

[22] Filed: May 21, 1986

[30] Foreign Application Priority Data

May 23, 1985 [SE] Sweden .............................. 8502570

[51] Int. Cl.⁴ ............................................. G06K 9/48
[52] U.S. Cl. ..................................... 382/21; 382/22; 382/41
[58] Field of Search ....................... 382/21, 22, 50, 51, 382/41, 47, 56

[56] References Cited

U.S. PATENT DOCUMENTS

| | | | |
|---|---|---|---|
| 3,979,722 | 9/1976 | Sakoe | 382/21 |
| 4,074,231 | 2/1978 | Yajima et al. | 382/54 |
| 4,206,441 | 6/1980 | Konda | 382/21 |
| 4,361,830 | 11/1982 | Honma et al. | 382/22 |
| 4,509,195 | 4/1985 | Nadler | 382/41 |
| 4,618,989 | 10/1986 | Tsukune et al. | 382/41 |
| 4,644,583 | 2/1987 | Watanabe et al. | 382/22 |

OTHER PUBLICATIONS

Reprinted from Proceedings of the IEEE Computer Society Conference on Pattern Recognition and Image Processing, PRIP 82, Las Vegas, Jun. 1982, "A Consistency Operation for Line and Curve Enhancement"—Martin Hedlund et al., pp. 1-4.

Primary Examiner—Leo H. Boudreau
Assistant Examiner—Joseph Mancuso
Attorney, Agent, or Firm—Witherspoon & Hargest

[57] ABSTRACT

The invention concerns an apparatus for determining the degree of consistency of a feature in a region of an image that is divided into discrete picture elements, the feature being represented by vector valued signals, one for each picture element, the vector direction describing the feature class and the vector magnitude describing the certainty in the feature assertion. The invention is characterized by a first unit (4) for weighted summation of the vectors in the region after predetermined rotations thereof, a second unit (5) for weighted summation of the magnitudes of the vectors in the region, and a norming unit (6) for norming the output signal from the first summation unit with respect to the sum of the output signal from the second summation unit and a reference signal (FIG. 2).

11 Claims, 4 Drawing Sheets

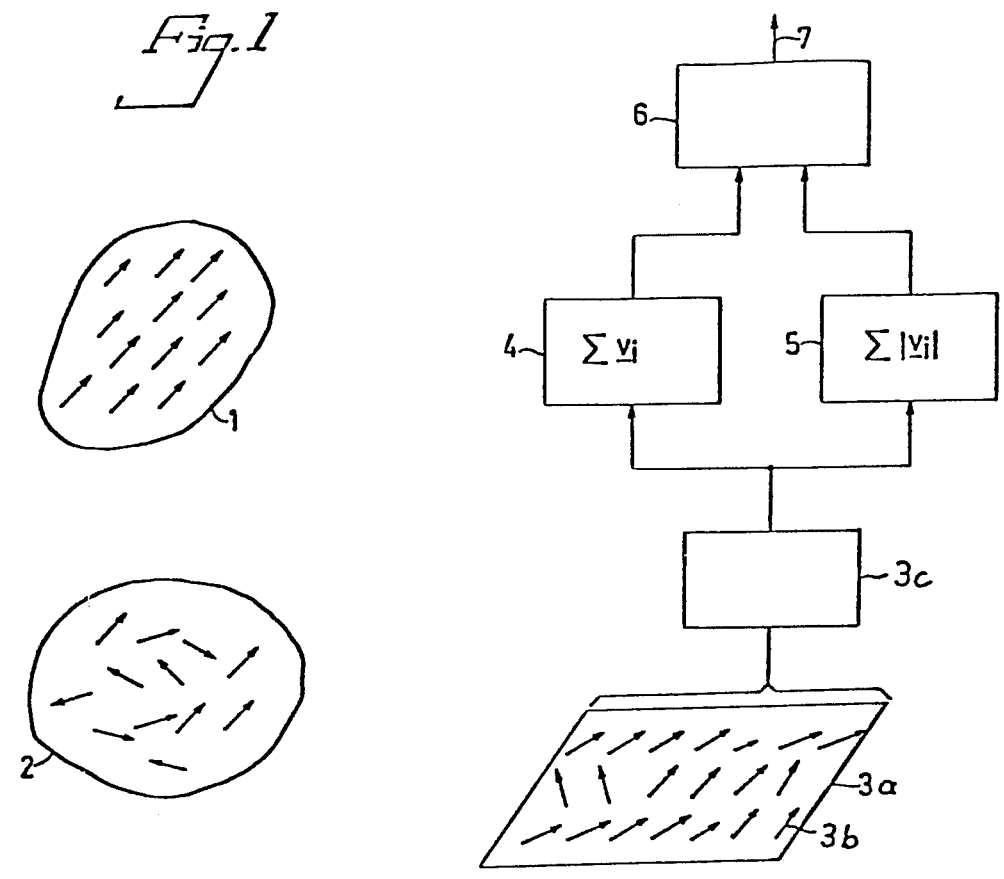
Fig.1
Fig.2
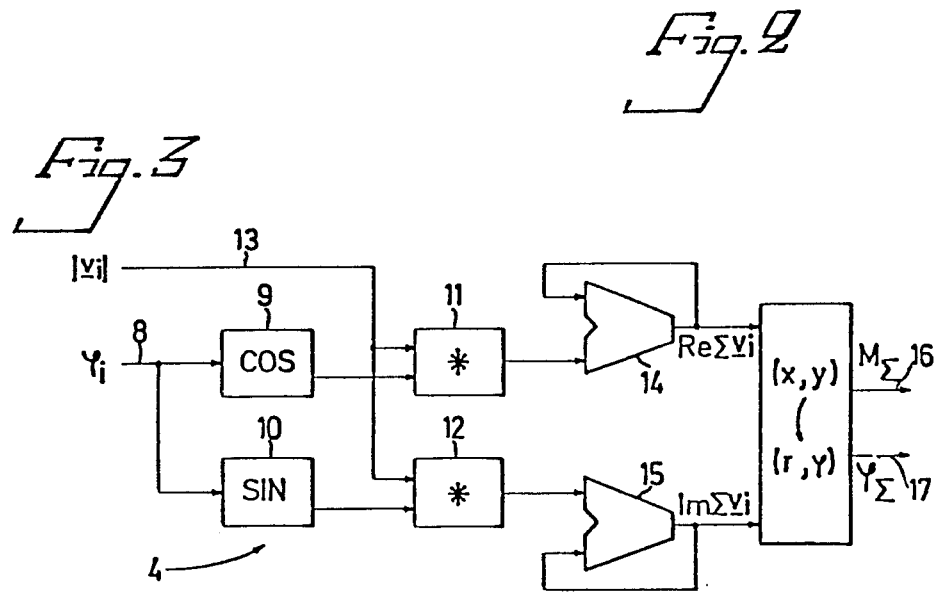
Fig.3

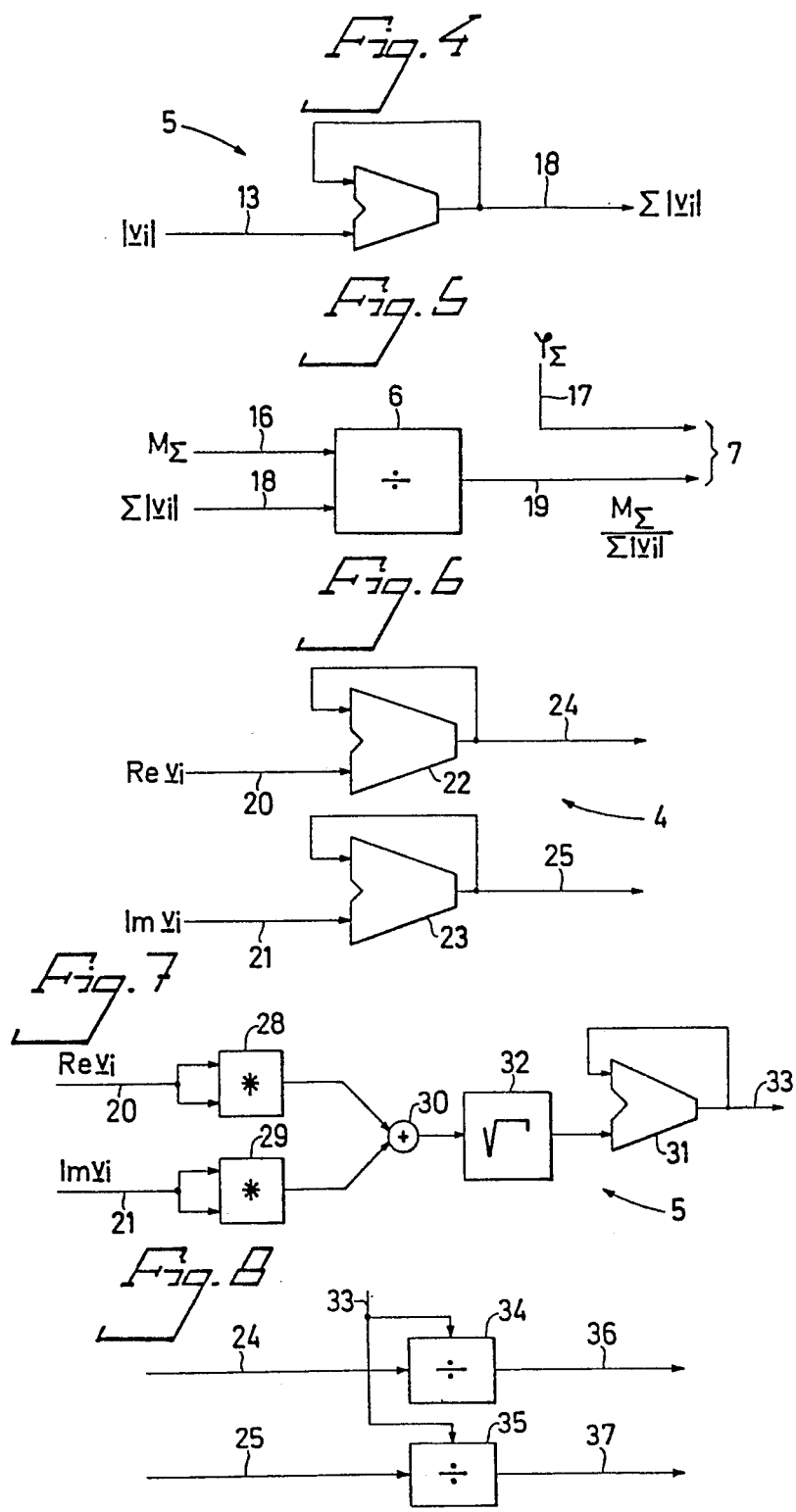

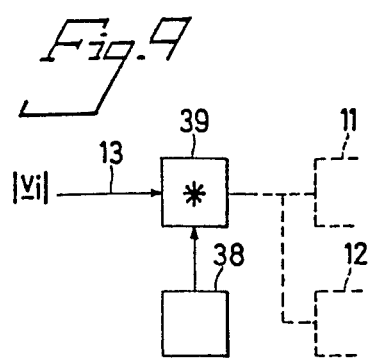
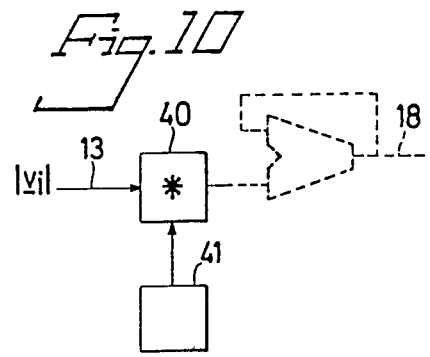
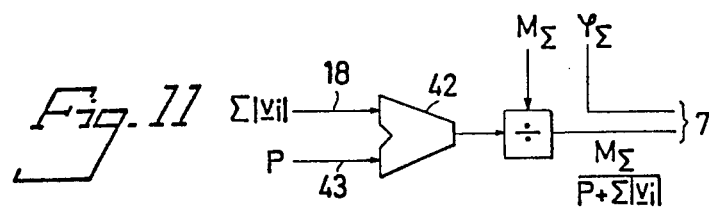
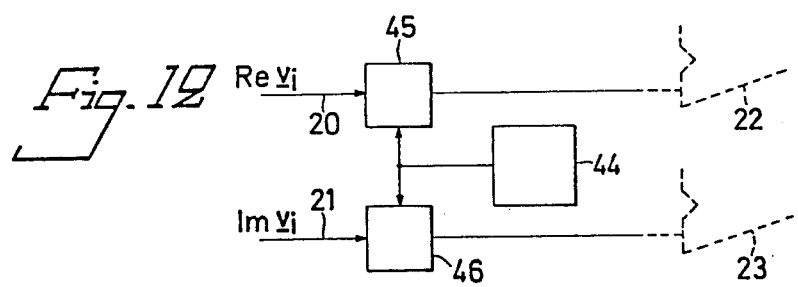
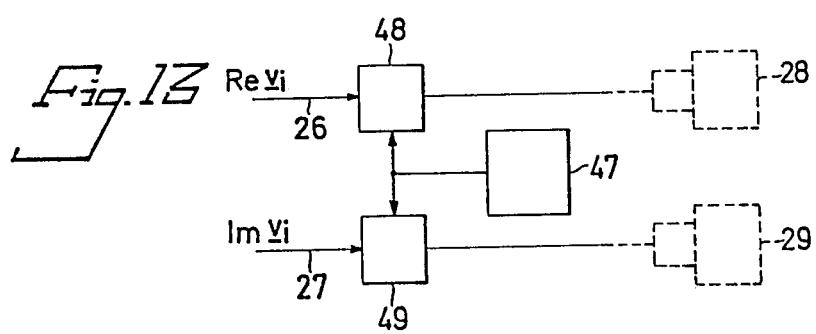

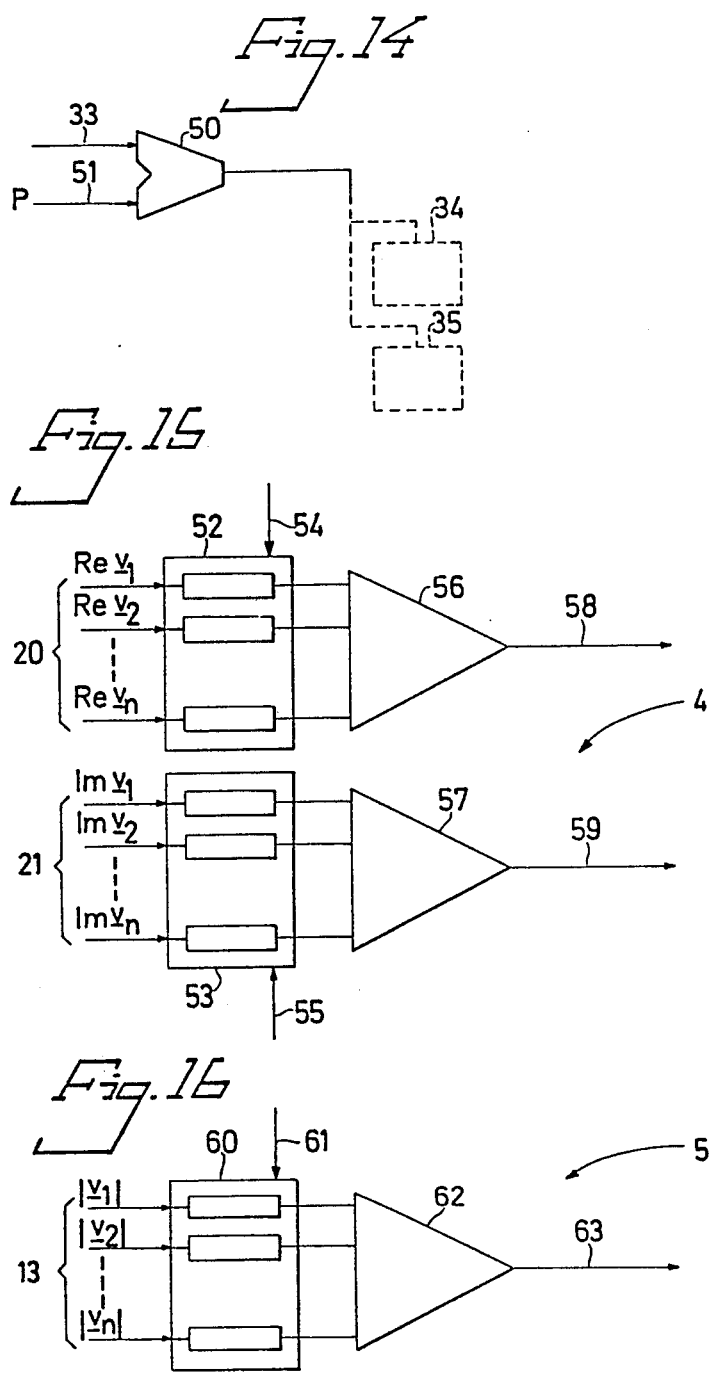

APPARATUS FOR DETERMINING THE DEGREE OF CONSISTENCY OF A FEATURE IN A REGION OF AN IMAGE THAT IS DIVIDED INTO DISCRETE PICTURE ELEMENTS

The present invention concerns an apparatus for fast and reliable detection of the degree of consistency of a feature in a region of a image.

BACKGROUND OF THE INVENTION

When interpreting the contents of images the detection of regions is a very important step in the analysis. Typically these regions are characterized in that one or more features within these regions are either relatively constant or vary in a predetermined manner. In other words, the features within these regions are considered to be consistent within the region. Such features may for example be local dominant orientation, local spatial frequency, the degree of curvature or a description of texture features and texture parameters. However, in such detection of regions, one of the problems heretofore encountered has been the difficulty in distinguishing between low level noise in the image and characterizing features that are not stable. Attempts to overcome this problem have centered around efforts in areas relating to computerized image analysis and in particular to methods which have been implemented by means of a program for use with a general purpose computer. However, such methods have been inherently slow.

SUMMARY OF THE INVENTION

The present invention thus concerns providing an apparatus which with high speed and reliability performs such a detection of the degree of consistency of a feature in an image that is divided into discrete picture elements.

The features characterizing the invention are disclosed in the accompanying patent claims.

For those special applications referred to in this context such an apparatus has proven to be thousands of times faster than a general computer.

The invention will be described below more in detail with respect to an apparatus for examination of a local region in an image that is divided into discrete picture elements. In the processing of a collection of discrete picture elements which represent a region of an image, a complete system can either include a number of such units working in parallel with different sub-regions of the image, or comprise one single unit made to successively analyze each sub-region of the image. These sub-regions ordinarily overlap each other.

To facilitate the description it is assumed that those features being taken into account are represented in the form of two-dimensional vectors, one for each picture element. In more general cases, however, the number of dimensions can exceed two. These vectors represent one feature, for example, dominating orientation. The vectors can, in the two-dimensional case, also be regarded as complex valued signals. Due to the nature of the vectors, the direction of each vector describes the dominant orientation of a structure in the image, while the magnitude of the vector represents the certainty in the assertion of this direction. For example, in the case of orientation, the feature class of a vertical line would correspond to an horizontal right hand vector arrow, the feature class of an horizontal line would correspond to an horizontal left hand vector arrow, and the feature class of lines at forty five degrees would correspond to respective vector arrows pointing upwards and downwards, as the case may be, the length of the arrows representing the assertion of the feature class or the certainty. This vector representation of the image can be obtained, for example, through the transformation of the original image, wherein each picture element can be assigned a monochrome level or an intensity level combined with a color code, according to the principles described in "IEEE TRANSACTIONS ON COMMUNICATIONS"; VOL. COM-31, No. 3, March 1983, pp. 388–406.

Generally, this invention relates to apparatus for the processing of a collection of discrete picture elements which represent a region of an image. The apparatus includes means for accessing vector valued signals from the collection, one for each of said discrete picture elements, each of said vector valued signals having a vector direction which describes the feature type and a vector magnitude which describes the certainty in the feature assertion, the vector valued signals representing the feature. In addition, means are coupled to the accessing means for producing a first vector valued output signal representative of the weighted summation of the vector valued signals in the region after predetermined rotations thereof. Means are coupled to the accessing means for producing a second output signal representative of the weighted summation of the magnitudes of the vector valued signals in the region. Finally, means are coupled to the means which produce the first vector valued output signal and the means which produce the second output signal for norming the first vector valued output signal with respect to the sum of the second output signal and a reference signal.

BRIEF DESCRIPTION OF THE DRAWING

The invention will be described more in detail below with reference to the accompanying drawing, in which:

FIG. 1 illustrates the problem situation in question,

FIG. 2 shows a block diagram of the apparatus according to the present invention, FIG. 3 shows a more detailed block diagram of the unit for the summation of the vectors of FIG. 2, FIG. 4 shows a more detailed block diagram of the unit for the summation of the vector magnitudes of FIG. 2, FIG. 5 shows a more detailed illustration of the norming unit of FIG. 2, FIG. 6 shows a block diagram of the unit for the summation of the vectors in an alternative embodiment of the apparatus of FIG. 2, FIG. 7 shows a block diagram of the unit for the summation of the magnitudes of the vectors in the alternative embodiment of the apparatus of FIG. 2, FIG. 8 shows a block diagram of the norming unit in the alternative embodiment of the apparatus of FIG. 2, FIGS. 9–14 show further developments of the above embodiments, and FIGS. 15–16 show parts of alternative analog embodiments of the present invention.

DESCRIPTION OF THE PREFERRED EMBODIMENTS

FIG. 1 illustrates the problem in question. A region 1 with a constant or consistent feature representing, for example, a certain orientation of the structures of the region, is characterized by vectors having the same direction. A region 2 with an irregular or non-constant feature means that the characterizing vectors have an orientation that varies more or less at random. The problem is such that it is desirable to be able to quickly and reliably distinguish the regions of type 1 from the regions of type 2. Thus, it is desirable to be able to measure the degree of consistency of the feature within a region.

FIG. 2 shows a block diagram of an apparatus according to the present invention. The Figure shows an apparatus for the processing of a region 3a of an image, the region 3a being divided into a collection of discrete picture elements pictorily represented in FIG. 2 by vectors 3b. The apparatus includes a means 3c for accessing vector valued signals from region 3a, one for each of the discrete picture elements. For example, the vector valued signals might be accessed from a memory using a central processing unit, address bus, memory and data bus in a known manner to access the vector valued signals from region 3a of the image, one vector valued signal being accessed for each discrete picture element. Each of the vector valued signals has a vector direction which describes the feature type and a vector magnitude which describes the certainty in the feature assertion, the vector valued signals representing the feature. In the embodiment described, region 3a is a region of characterizing vectors corresponding to a sub-region or a window of an image that is transformed as described above and divided into discrete picture elements, within which window a measurement is to be performed. Typically this region includes 11×11 two-dimensional vectors. Certainly other sizes of the region are possible, for instance 15×15 vectors. However, the region should contain at least 3×3 vectors to give a meaningful result. The values of the vector components within this region are detected by two different measuring means 4 and 5. In particular, a means 4 is coupled to the accessing means 3c for producing a first vector valued output signal representative of the weighted summation of the vector valued signals in the region 3a after predetermined rotations thereof. A means 5 is also coupled to the accessing means 3c for producing a second output signal representative of the weighted summation of the magnitudes of the vector valued signals in the region 3a. In addition, a means 6 is coupled to the means which produce the first vector valued output signal and the means which produce the second output signal for norming the first vector valued output signal with respect to the sum of the second output signal and a reference signal. This norming means outputs a signal 7, the magnitude of which characterizes the degree of consistency of the feature within the region in question and the direction of which characterizes the mean value of the vector directions within the region.

A first embodiment of the apparatus according to FIG. 2 will now be described with reference to FIGS. 3–5.

FIG. 3 shows more in detail the unit or measuring means 4 of FIG. 2. It is here assumed that the different vectors occurring within a neighborhood around the "measuring point" are represented by a vector direction being represented by phase signals and a vector magnitude being represented by magnitude signals. In a digital representation the magnitude can for example be represented by a number between 0 and 255, i.e. by one byte. In the same way the phase angle can also be represented by one byte. Each discrete picture element will therefore be allocated two bytes in a storage unit, which represent the vector belonging to the discrete picture element. If another digital resolution is desired, other storage allocations are of course conceivable. The information can also be represented in an analog from such as voltage or current. It is also assumed that a suitable mechanism, such as an address generator, provides out of the memory the current vector valued signals for a neighborhood around the measuring point. Apparatus for such a provision represent however, well known art, and therefore are not objectives of this application. The phase signal 8 of a vector is taken to a cosine generator such as look up table 9 for cosine and a sine generator such as look up table 10 for sine. The values that are obtained are supplied to each multiplicator 11 and 12, respectively. An additional input signal to each multiplicator is the vector magnitude 13. The output signals from the multiplicators are each passed to their corresponding adders 14 and 15, respectively, which are provided with a feed back to function as summators. As output signals from each summator, values are obtained that represent the real part and the imaginary part, respectively, or expressed in another way, the x- and y-component, respectively, of the vector sum within the above mentioned neighborhood.

This obtained vector valued signal is passed on to be a converter where it is converted from rectangular to polar format, the result being in the form of magnitude output signal 16 and phase output signal 17.

FIG. 4 shows more in detail the structure of the unit or measuring means 5 of FIG. 2. The mentioned vector magnitude signal 13 is passed on to an adder, which is provided with a feed back to function as a summator. The output signal 18 from the summator will represent the sum of all vector magnitudes within the viewed neighborhood.

FIG. 5 shows more in detail the norming means or unit 6 of FIG. 2. The unit, in its basic form, consists of a division unit, in which the magnitude output signal 16 of the vector sum is divided by the sum 18 of the magnitudes of the individual vectors. The result is a normed output magnitude 19. Together with the earlier obtained phase output signal 17 this will render a description of how consistent the features are within the viewed region around the measuring point and the weighted mean value of the directions of the vectors within the region, respectively.

It has been described above how a measure of the degree of consistency of a feature in a region around a measuring point, which corresponds to a discrete picture element of the original image, is obtained by an embodiment of the apparatus according to the present invention. In a corresponding way, other image elements of the image can also be examined with regard to the degree of consistency of the feature in neighborhoods around these discrete picture elements. This can be done either by one apparatus that gradually scans the image by moving the "window" to neighborhoods of new discrete picture elements, or by a plurality of apparatus that in parallel scan the neighborhood around different discrete picture elements.

With the above described embodiment the vectors are represented in a polar format. Alternatively, the viewed vectors can be represented by components in a rectangular format, where one component corresponds to the real part and the other component corresponds to the imaginary part of a complex valued signal, or expressed in another way, the x- and y-component of a vector valued signal. It is also assumed for this implementation that an appropriate mechanism, such as an address generator, out of a storage provides the current vector valued signals for the neighborhood around the measuring point. The block diagram of FIG. 2 is also in this case applicable for the apparatus.

The alternative embodiment of the invention will now be described more in detail with reference to FIGS. 6–8.

FIG. 6 shows the structure of the now applicable unit 4 for vector summation. The real part of x-component 20 and the imaginary part or y-component 21 of the vectors are each carried to their corresponding adders 22 and 23 respectively, which are coupled as summators. They provided as output signals the sum f the real parts 24 and imaginary parts 25 of the vectors within the viewed neighborhood.

FIG. 7 shows the structure of the unit for the summation of vector magnitudes within the viewed neighborhood. The real part or x-component 20 and imaginary part or y-component 21 are each carried to their corresponding multiplicator 28 and 29, respectively, which are coupled as squaring means. The output signals from these means are passed on through an adder 30 and through a unit 32, which generates the square root of these components, and into an adder coupled as a summator 31. The summator will provide the sum 33 of the magnitudes of the vectors.

FIG. 8 shows the unit 6 of FIG. 2 for norming of the two types of vector sums for the current representation. The earlier obtained sums of the real parts 24 and imaginary parts 25 are brought each to their corresponding norming unit 34 and 35 respectively. They are there divided by the earlier obtained vector magnitude sum 33. The output signals 36 and 37 obtained thereby represent in the form of rectangular components the desired description of how consistent a feature is within the observed region as well as the weighted mean value of the directions of the vectors.

Some further developments of the invention are described below with reference to FIGS. 9–14.

In more general cases it may be desirable that the above described measurement be performed with a certain weighting of the vector valued signals that are within the viewed neighborhood. This is shown in FIG. 9 in connection with unit 4 of FIG. 2. For this purpose the magnitude signals 13 delivered to a multiplicator 39 are multiplied by weighting coefficients stored in a memory 38 before the summation takes place. Such weighting coefficients in such memory collectively form a "mask". These coefficients can be complex valued. Complex valued coefficients have the advantage of providing a pure scaling as well as a rotation of the vectors prior to summation. This gives a greater flexibility as regards the type of features that can be detected. The additional possibility of rotation makes it possible to detect regions in which the vectors are mutually rotated in a predetermined manner, the predetermined manner being represented by a "rotation mask".

The same type of function is shown in FIG. 10 in connection with the unit 5 of FIG. 2. For this purpose the magnitude signals 13 being delivered to a multiplicator 40 are multiplied by the weighting coefficients stored in a memory 41 before the summation takes place. In some cases the memories 38 and 41 can comprise the same unit.

It is understood that the earlier described measurement represents a special case of the weighting with the weighting coefficients equalling 1. This corresponds to the case where one wants to detect whether the vectors within the region are mutually parallel. However, if it is desired to detect whether the vectors "rotate" in a predetermined manner within the region, the coefficients will be complex. In this case the rotation of each vector in a predetermined "rotation mask" with respect to for instance the x-axis will depend on the values of the complex valued coefficients.

In the more general case, in which the feature is represented by a n-dimensional vector, where n>2, the complex valued weighting factors are instead comprised of n×n matrices that can rotate and scale the vectors in a n-dimensional vector space.

In this more general case the apparatus is supplemented by additional elements. Thus, for instance the device of FIG. 6 is supplemented by additional summators 22, 23 until the number of summators corresponds to the number of dimensions n. In a similar way the device of FIG. 7 is supplemented by additional squaring units.

In some cases the norming may be sensitive to noise, for example when the information consists of signals of low magnitude. In such cases it is preferred that the norming be done in relation to a certain base level in the form of an additional signal 43 which is added by an adder 42 to the sum signal 18 of the vector magnitudes, as shown in FIG. 11. Here as well, it is understood that the earlier described measurement represents a special case, that is, the case where the base level or the reference signal equals 0.

The above disclosed further developments of the invention apply to vectors in a polar format. They can also be implemented for a rectangular format, as is shown in FIGS. 12–14. Weighting coefficient memories 44 and 47 are here delivering equivalent coefficients or matrices, by means of which the signals 20, 21 and 26, 67 respectively are weighted by multiplicators 45, 46 and 48, 49 respectively. Analogous to the above, a base level 51 can also be added to the signal 33 by an adder 50.

The above described implementation mainly relates to digital technique, the vectors of the picture elements being represented in a digital form. The described functions, however, can advantageously be performed by analog technique. The structures that are specific for this form of implementation are shown in FIGS. 15 and 16.

According to FIG. 15 the first summation unit 5 sums up all real parts 20 and imaginary parts 21 of the vectors multiplied by respective weighting factors implemented by implementing means such as resistor networks 52, 53, multiplying D/A-converters controlled by digital control signals 54, 55, after which procedure the signals are carried further to summators 56, 57. The multiplication can be seen as a reflection of Ohm's law. The advantage of using multiplying D/A-converters is that the resulting resistance value corresponding to the multiplication factor is adjustable by a digital control signal.

According to FIG. 16 the second summation unit 5 sums up all the components of the magnitude signal 13 of the vectors multiplied by weighting factors implemented by implementing means such as resistor network 60, or multiplying D/A-converters controlled by control signals 61, after which procedure the signals are carried further to a summator 62, such as an operational amplifier with a feed back function.

In the embodiment according to FIGS. 15 and 16 the signals are assumed to be accessible on the one hand as real and imaginary parts, and on the other hand as magnitude. This provides a particularly simple structure of the apparatus. Under the same premises the units according to FIGS. 4 and 6 can also be combined. It is thus understood that it can be desirable to store the picture elements in rectangular form as well as in polar form, or to at least store, besides the rectangular form, also the vector magnitudes. The extra requirement of memory space caused by this is compensated by the simplified structure of the apparatus. This is especially applicable if the whole or greater parts of the image is to undergo a one-step examination made by a plurality of parallel working apparatus.

As is evident from the above description the apparatus according to the present invention can be varied in several ways. Only a few examples of available possibilities have herein been described. The frame of the invention should therefore not be regarded as confined to these examples. It should instead be of a scope described by the accompanying patent claims.

We claim:

1. Apparatus comprising:
   first means for recording a first image of a physical object or scene and dividing said first image into discrete picture elements;
   second means for transforming said first image which has been divided into discrete picture elements into a vector representation, said vector representation comprising vector valued signals,
   third means for accessing said vector valued signals from a plurality of picture elements which collectively form a plurality of overlapping regions of a vector valued image, one vector valued signal for each element of said plurality of picture elements, each of said vector valued signals having a vector direction which describes features class and a vector magnitude which describes certainty in feature assertion;
   fourth means coupled to said accessing means for producing a first vector valued output signal for each region of said plurality of overlapping regions, said first vector valued output signal, in each respective region, being representative of vector valued signals which have been rotated a predetermined amount and then subjected to a weighted summation;
   fifth means coupled to said accessing means for producing a second output signal, for each region of said plurality of overlapping regions, representative of weighted summation of said magnitude of said vector valued signals in each respective region; and,
   sixth means coupled to said fourth and fifth means for norming said first vector valued output signal, for each region of said plurality of overlapping regions, with respect to the sum of said second output signal, for each region of said plurality of overlapping regions, and a reference signal, for each region of said plurality of overlapping regions thereby producing a second image representing characterizing properties of a recorded image of said physical object or scene.

2. Apparatus according to claim 1 wherein said fourth means includes a cosine generator to a first multiplicator which is coupled to a first adder, provided with a feed back to function as a summator, which is coupled to a converter, and wherein said fourth means further includes a sine generator coupled to a second multiplicator which is coupled to a second adder, provided with a feed back to function as a summator, which is coupled to said converter, said vector direction being represented by phase signals which are provided to said cosine generator and said sine generator for conversion to cosine and sine components, respectively, said cosine component being provided to a first input of said first multiplicator, and said sine component being provided to a first input of said second multiplicator, said vector magnitude being represented by magnitude signals which are provided to a second input of said first multiplicator and a second input of said second multiplicator, the resulting product of said cosine component and said magnitude signals being provided as an input to said first adder, and the resulting product of said sine component and said magnitude signals being provided as an input to said second adder, the output of said first adder and the output of said second adder being provided to respective inputs of said converter which converts the output of said first adder and said second adder from a first and second rectangular coordinate to a first and second polar coordinate in the form of a magnitude output signal and a phase output signal.

3. Apparatus according to claim 2 wherein said fourth means includes a third multiplicator coupled to a memory, said magnitude signals being provided to said multiplicator, and multiplied by weighting factors supplied from said memory, before being provided to said second input of said first and second multiplicators.

4. Apparatus according to claim 1 wherein said fourth means includes adders each of which is provided with a feed back to function as a summator, first components of said vector valued signals being provided to and summed by one of said adders, and fourth components of said vector valued signals being provided to and summed by the other of said adders, the output of said adders providing said first vector valued output signal of said second means.

5. Apparatus according to claim 4, wherein said fourth means further includes a first multiplicator and a second multiplicator and a memory, said first components being multiplied in said first multiplicator by weighting factors supplied from said memory, and said second components being multiplied in said second multiplicator by weighting factors supplied from said memory, before said first and second components are provided to said adders.

6. Apparatus according to claim 1 wherein said fourth means includes a first implementing means coupled to a first summator, and a second implementing means coupled to a second summator, and wherein said fourth means sums up all of said first components multiplied by weighting factors that are implemented by said first implementing means subsequent to which first resulting signals are passed from said first implementing means to said first summator, and wherein said fourth means sums up all of said second components multiplied by weighting factors that are implemented by said second implementing means subsequent to which second resulting signals are passed from said second implementing means to said second summator, said first and second summators thereby providing said first vector valued output signal of said fourth means.

7. Apparatus according to claim 1 wherein said fifth means includes an adder provided with a feed back which functions as a summator, magnitude signals of said vector valued signals being provided to an input of said adder, the output of said adder providing said second output signal of said fifth means.

8. Apparatus according to claim 7, wherein said fifth means further includes a multiplicator and a memory, said magnitude signal being multiplied in said multiplicator, by weighting factors supplied from said memory, and then provided to said adder.

9. Apparatus according to claim 1 wherein said fifth means includes an implementing means coupled to a summator, and wherein said fifth means sums up all of the components of magnitude signals, of said vector valued signals, multiplied by weighting factors implemented by said implementing means, subsequent to which the resulting signals are passed to said summator, said summator thereby providing said second output signal of said fifth means.

10. Apparatus according to claim 1 wherein said fifth means includes a first multiplicator and a second multiplicator, said first and second multiplicators being coupled to a first adder which is coupled to a unit which is coupled to a second adder which is provided with a feed back to function as a summator, first components of said vector valued signals being provided toinputs of said first multiplicator for squaring and second components of said vector valued signals being provided to inputs of said second multiplicator for squaring, the output signals of said first and second multiplicators being provided to the input of said first adder for summing, the output signals of said first adder being provided to the input of said unit for forming the square root of said output signals of said first adder, the output signals of said unit being provided to the input of said second adder for adding to produce said second output signal of said fifth means.

11. Apparatus according to claim 10 wherein said fifth means includes a third multiplicator and a fourth multiplicator, said third and fourth multiplicators being coupled to a memory, said third multiplicator also being coupled to said first multiplicator and said fourth multiplicator also being coupled to said second multiplicator, said first components being provided to the input of said third multiplicator for multiplying by a weighting factor supplied from said memory and then being provided to said inputs of said first multiplicator, and said second components being provided to the input of said fourth multiplicator for multiplying by a weighting factor supplied from said memory and then being provided to said inputs of said second multiplicator.

* * * * *